United States Patent
Liu et al.

(10) Patent No.: US 11,409,951 B1
(45) Date of Patent: Aug. 9, 2022

(54) FACILITATING ANNOTATION OF DOCUMENT ELEMENTS

(71) Applicant: INTERNATIONAL BUSINESS MACHINES CORPORATION, Armonk, NY (US)

(72) Inventors: Xiangning Liu, Koto-ku (JP); Tohru Hasegawa, Tokyo (JP); Takuya Goto, Kodaira (JP); Asako Ono, Setagaya (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/484,468

(22) Filed: Sep. 24, 2021

(51) Int. Cl.
*G06F 40/169* (2020.01)
*G06F 3/0481* (2022.01)

(52) U.S. Cl.
CPC .......... *G06F 40/169* (2020.01); *G06F 3/0481* (2013.01)

(58) Field of Classification Search
CPC ............................ G06F 40/169; G06F 3/0481
See application file for complete search history.

(56) References Cited

U.S. PATENT DOCUMENTS

| | | | |
|---|---|---|---|
| 5,146,552 A * | 9/1992 | Cassorla | G06Q 10/10 715/244 |
| 10,042,832 B1 * | 8/2018 | Vagell | G06F 40/169 |
| 11,010,371 B1 * | 5/2021 | Slomka | G06F 16/252 |
| 11,120,200 B1 * | 9/2021 | Totale | G06F 3/04842 |
| 2007/0150801 A1 * | 6/2007 | Chidlovskii | G06K 9/6264 715/210 |

(Continued)

FOREIGN PATENT DOCUMENTS

| | | | | |
|---|---|---|---|---|
| GB | 2587094 A | * | 3/2021 | G06F 3/0481 |
| JP | 2019192022 A | | 10/2019 | |

(Continued)

OTHER PUBLICATIONS

"INCEpTION User Guide", Version 0.17.3, updated Dec. 29, 2020, 148 pgs.

(Continued)

*Primary Examiner* — Asher D Kells
(74) *Attorney, Agent, or Firm* — Rakesh Roy; Matthew M. Hulihan; Heslin Rothenberg Farley & Mesiti PC

(57) ABSTRACT

Facilitating annotation of document elements includes obtaining annotations indicating labels applied to document elements of a digital document to be presented in an annotation graphical user interface (GUI), the digital document including the document elements, the document elements being for visual presentation in the annotation GUI to a user, and presenting the annotation GUI on a display device for the user, the annotation GUI configured to facilitate user submission of a respective label for each document element of the document elements, where the presenting presents, as part of the annotation GUI, at least a portion of the digital document including the document elements, and, for each document element, a respective label indicator correlating to the document element and visually indicating a current label selected for that document element and a label submission status for that document element that reflects whether the user has confirmed a label for that document element.

20 Claims, 10 Drawing Sheets

(56) References Cited

U.S. PATENT DOCUMENTS

| | | | | |
|---|---|---|---|---|
| 2010/0023319 A1* | 1/2010 | Bikel | ............... | G06F 40/169 704/9 |
| 2011/0007366 A1 | 1/2011 | Sarkar et al. | | |
| 2014/0149857 A1* | 5/2014 | Vagell | ............... | G06F 40/169 715/255 |
| 2014/0223284 A1 | 8/2014 | Rankin, Jr. et al. | | |
| 2014/0337705 A1* | 11/2014 | Glover | ............... | G06F 3/0481 715/230 |
| 2016/0026899 A1 | 1/2016 | Wang et al. | | |
| 2016/0070687 A1* | 3/2016 | Shigeta | ............... | G06F 40/169 715/232 |
| 2016/0180167 A1* | 6/2016 | Watts-Englert | ............... | G06F 3/0481 715/761 |
| 2017/0185575 A1* | 6/2017 | Sood | ............... | G06F 40/169 |
| 2019/0197778 A1* | 6/2019 | Sachdeva | ............... | G06T 15/30 |
| 2019/0370918 A1* | 12/2019 | Pemmaraju | ............... | G06F 16/335 |
| 2020/0019599 A1* | 1/2020 | Lynch | ............... | G06F 40/169 |
| 2020/0065770 A1* | 2/2020 | Janapareddy | ............... | G06F 8/38 |
| 2020/0293607 A1* | 9/2020 | Nelson | ............... | G06N 20/00 |
| 2020/0293712 A1 | 9/2020 | Potts et al. | | |
| 2020/0301950 A1* | 9/2020 | Lorrain-Hale | ............... | G06F 3/0482 |
| 2020/0342165 A1* | 10/2020 | Butkovic | ............... | G06F 40/216 |
| 2020/0364294 A1* | 11/2020 | Brown | ............... | G06F 40/216 |
| 2021/0192126 A1* | 6/2021 | Gehrmann | ............... | G06F 3/0482 |

FOREIGN PATENT DOCUMENTS

| | | | |
|---|---|---|---|
| JP | 2019197389 A | 11/2019 | |
| JP | 2020006788 A | 1/2020 | |
| JP | 2020009141 A | 1/2020 | |
| JP | 2020064564 A | 4/2020 | |
| JP | 2020126414 A | 8/2020 | |
| JP | 2020160916 A1 | 10/2020 | |
| WO | WO-2021231925 A1 * | 11/2021 | ............. A61K 39/12 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

FACILITATING ANNOTATION OF DOCUMENT ELEMENTS

BACKGROUND

For datasets with thousands or millions of digital documents, it can be desired to apply labels to document elements (chapters, sections, paragraphs, sentences, phrases, words, characters, graphics, charts, etc.), the labels providing some useful metadata about those elements. In user manuals, for instance, the Frequently Asked Questions portion might include topics, questions, and answers. Labeling these different document elements as such can be helpful.

SUMMARY

Shortcomings of the prior art are overcome and additional advantages are provided through the provision of a computer-implemented method. The method obtains annotations indicating labels applied to document elements of a digital document to be presented in an annotation graphical user interface (GUI). The digital document includes the document elements, and the document elements are for visual presentation in the annotation GUI to a user. The method also includes presenting the annotation GUI on a display device for the user. The annotation GUI is configured to facilitate user submission of a respective label for each document element of the document elements. The presenting presents, as part of the annotation GUI, at least a portion of the digital document including the document elements. The presenting also presents, as part of the annotation GUI, and for each document element of the document elements, a respective label indicator correlating to the document element. The respective label indicator visually indicates a current label selected for that document element and a label submission status for that document element, where the label submission status is reflective of whether the user has confirmed a label for that document element.

Further, a computer system is provided that includes a memory and a processor in communication with the memory, wherein the computer system is configured to perform a method. The method obtains annotations indicating labels applied to document elements of a digital document to be presented in an annotation graphical user interface (GUI). The digital document includes the document elements, and the document elements are for visual presentation in the annotation GUI to a user. The method also includes presenting the annotation GUI on a display device for the user. The annotation GUI is configured to facilitate user submission of a respective label for each document element of the document elements. The presenting presents, as part of the annotation GUI, at least a portion of the digital document including the document elements. The presenting also presents, as part of the annotation GUI, and for each document element of the document elements, a respective label indicator correlating to the document element. The respective label indicator visually indicates a current label selected for that document element and a label submission status for that document element, where the label submission status is reflective of whether the user has confirmed a label for that document element.

Yet further, a computer program product including a computer readable storage medium readable by a processing circuit and storing instructions for execution by the processing circuit is provided for performing a method. The method obtains annotations indicating labels applied to document elements of a digital document to be presented in an annotation graphical user interface (GUI). The digital document includes the document elements, and the document elements are for visual presentation in the annotation GUI to a user. The method also includes presenting the annotation GUI on a display device for the user. The annotation GUI is configured to facilitate user submission of a respective label for each document element of the document elements. The presenting presents, as part of the annotation GUI, at least a portion of the digital document including the document elements. The presenting also presents, as part of the annotation GUI, and for each document element of the document elements, a respective label indicator correlating to the document element. The respective label indicator visually indicates a current label selected for that document element and a label submission status for that document element, where the label submission status is reflective of whether the user has confirmed a label for that document element.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Figure 1:
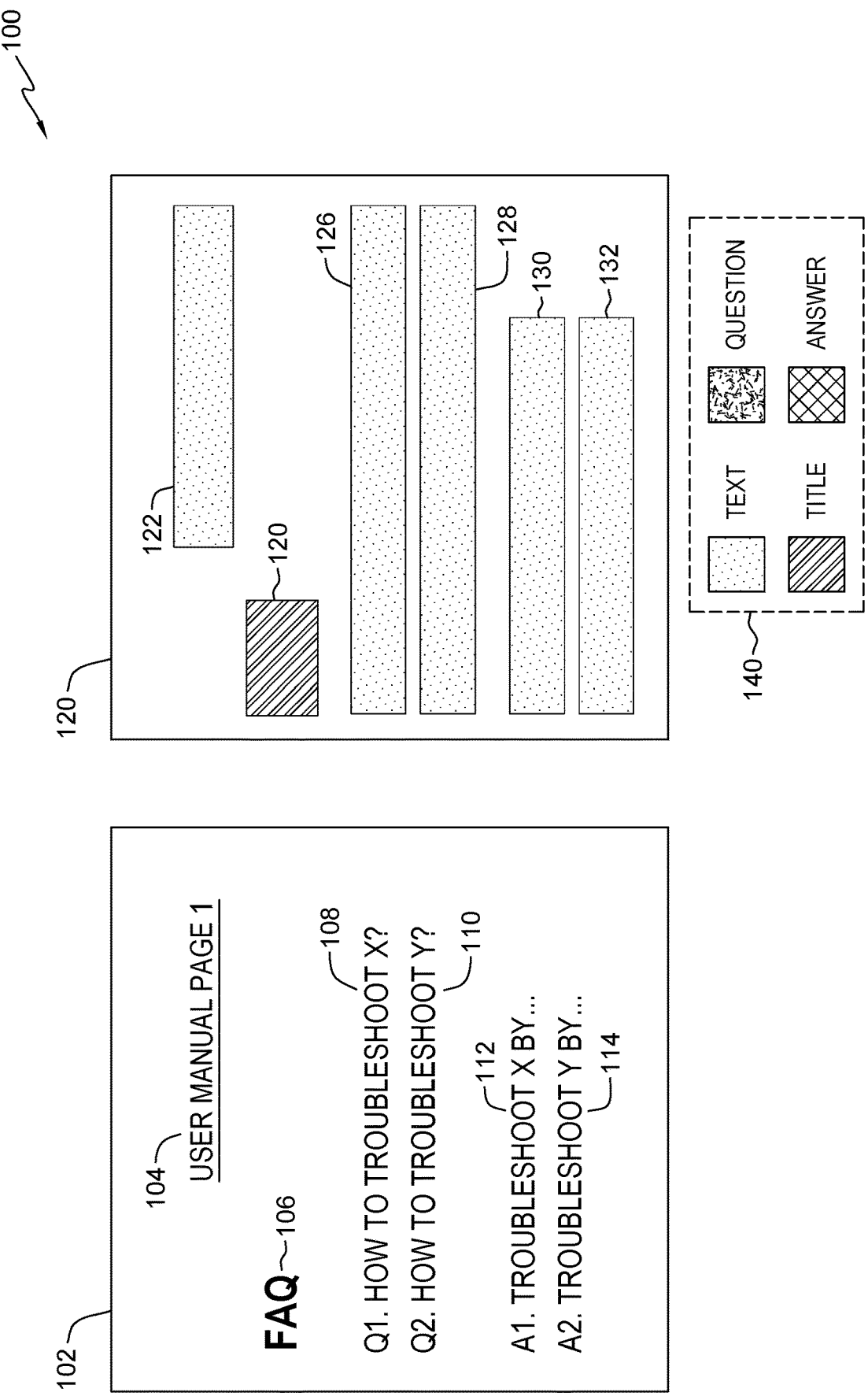
FIG. 1 depicts an example annotation user interface showing a document page and associated auto-annotated labels for elements of the document page.

Digital documents typically include text, graphics, and other data elements. This document data can be arranged in pages through which users can scroll to review the document. Common types of documents include papers, articles, and the like, though documents could also refer to other compositions containing text and/or other elements, such as presentations or slide decks and program source code that users view and edit in source code editors. There are just example types of documents and data elements thereof; many other examples exist.

Some systems can process documents and use a pre-trained machine learning/artificial intelligence (AI) model to automatically annotate elements of those documents. An example annotation is a label applied to a document element. For purposes of training the model, a training set with data/document elements and labels applied thereto as annotations may be taken as so-called ground truths for purposes of model training.

The annotations of document elements with labels may be a form of metadata of the documents. Proper labeling of document elements could be useful for later training of the model or other models to properly recognize different types of documents elements, which in turn helps document data mining and other activities.

As a basic example, it may be desired to build an AI model that can recognize and properly identify certain types of elements contained in user manual documents. Proper model training relies on good training data. Good training data for user manual documents has the proper labels applied to the various types of document elements—questions and answers, frequently asked questions, etc. that are commonly found in user manuals. These proper labels are taken as ground truths to provide supervised machine learning.

In an effort to train the AI model and/or provide ground truths, or more broadly if it is desired to label document elements of a document, a user might use an annotation user interface (UI)—also referred to herein as an annotation graphical user interface (GUI)—presented on display(s) of a computer system to check and potentially change labels that have been automatically applied/indicated for various document elements by a system/process utilizing the AI model. In this regard, a system might automatically-annotate (auto-annotate/pre-annotate) document elements with labels determined using an AI model. Labels are therefore annotations that are applied to the document elements. The process of the system auto-annotating document elements based on applying the model can be referred to as 'pre-annotating' the elements with labels ('pre-annotations') for those elements.

A process, such as one invoked when the annotation GUI is opened and a digital document that has been pre-annotated is selected, can obtain these annotations indicating the labels applied to document elements of the document. The annotations can be presented to the user in the annotation GUI and subject to user review, selection, and submission, or confirmation, of proper labels for those document elements. The labels are initially system-selected and applied automatically but are 'unsubmitted' at that point and are subject to change based on the user review and submission to confirm the proper labeling of the document elements.

Systems that auto-annotate elements will typically produce and rely on some values of confidence level that the system/model has in the labels with which it has pre-annotated the elements. A model might label a document element with LabelA at a confidence of 80%. The next-highest level of confidence produced by the model might be 20% in favor of LabelD. The model might reflect a very low or zero confidence of other candidate labels, for instance LabelB and LabelC, for that element in this case.

A user can change the label of a document element when necessary using the annotation GUI. Any labels applied to an element (either selected/changed by the user or auto-applied) can be and 'submitted' or 'confirmed' as a ground truth. In some examples, a submission by the user (clicking a button, checking a box, selecting a label from a list) may be taken as confirmation that an applied label is submitted/confirmed. In other examples, it may be taken by an implicit submission, for instance when the user reviews one page of the document, potentially makes some label changes to elements on that page, and then proceeds to another page of the document. This may be taken as an implicit acceptance/confirmation of the labels of all of the elements of that one page.

However, a problem can arise when a user is unsure about a current label applied to a document element—such as a pre-annotation by the system or a label tentatively applied by a user—and needs assistance. The user might desire to check the system-determined confidence of the current label for the element and/or might desire to check other candidate labels and the system-determined confidences for those labels.

FIG. 1 depicts an example annotation user interface showing a document page and associated auto-annotated labels for elements of the document page. Interface 100 displays a portion (e.g., a page 102) of a document with document elements 104, 106, 108, 110, 112 and 114. This is displayed on the left side of the interface 100 in a document display portion thereof. Each of the document elements of this displayed page 102 are text (character string) elements in this example, though document elements could be other types, for instance graphics, images, tables, markings, or any other type of data element of a document. A computer system can build and present the annotation GUI on display device(s) for the user. Generally, as explained herein, the annotation GUI is configured with elements to enable a user to review, select/change, and submit a respective label for each/any document element of the document.

Interface 100 also includes an annotation, or label indicator, portion 120, showing label indicators 122, 124, 126, 128, 130, 132, i.e. one for each of the aforementioned elements of the document page 102. The label indicators correlate to the document elements and reflect annotations 'applied' to the document elements in that each label indicator correlates to a respective document element to indicate a label/annotation of that element.

The relative positions of the label indicators in portion 120 match the relative positions of the document elements from 120 to which they correspond. Label indicator 122 corresponding to element 104 is positioned in portion 120 such that its position substantially coincides with the position of element 104 in the document page 102—they both occupy an approximately equivalent size rectangle of space toward the top right corner of their respective areas (document page, portion 120) in the interface 100. Further, the positions of the different label indicators relative to each other in portion 120 aligns with the positions of the different document elements, to which those labels indicators correspond, relative to each other in page 102. Label indicator 126 (for element 108) is shown above label indicator 128 (for element 128) in portion 120, which is consistent with the position of those elements (108 above 110) in the document page.

Here, the label indicators are presented as different highlight patterns that map to different labels. These mappings are defined by legend 140. There are four labels (text, title, question, answer) shown, each mapped to a respective different highlight pattern. The candidate labels for labeling elements of document page 102 therefore include title (for page title elements), question (for question elements), answer (for answer elements that are answers to a question), and text (for miscellaneous other text on the page).

Each candidate label of this collection is associated with a different visual property (highlight pattern in this example) that uniquely identifies that candidate label out of the collection of candidate labels. Each such visual property can be applied to any given label indicator correlating to a document element that is labeled with that candidate label.

As an example, the highlight pattern associated with the label 'text' has been applied to the label indicators 122, 126, 128, 130 and 132 in the example of FIG. 1.

Though the different highlight patterns in this example are different line patterns, any other appropriate indicators/properties, whether they be highlight patterns or otherwise, could be used. For instance, unique visual properties could be reflected by different highlights, patterns, colors, shapes, or other indicators that can visually distinguish between different labels in the interface portion 120. As a specific example, the label indicators 122, 124, . . . , 132 could be rectangular, color-highlighted blocks (e.g. yellow, green, red, blue) corresponding to the different labels 'text', 'title', 'question', and 'answer', respectively.

If the user changes a current label for a document element from a first candidate label to a second candidate label, the annotation UI can update to change the label indicator for that document element accordingly, for instance to visually indicate the second candidate label. Before the change, the label indicator reflects the visual property that uniquely identifies the first candidate label, and the user changing the label causes a change in the label indicator to reflect the visual property that uniquely identifies the second candidate label.

In FIG. 1, label indicator 122 correlates to element 104 and uses the highlight pattern for the label 'text'. This indicates that the element 104 has been labeled (auto-annotated with the label) as 'text'. Similarly, label indicator 124 uses the highlight pattern for the label 'title', indicating that the element 106 has been labeled as 'title'.

It is not clear from the interface 100 in FIG. 1 which auto-annotations (labels automatically applied based on an AI model) have and have not been confirmed/submitted by a user. Such an indication could be useful in informing the user which auto-annotations the user has, and has not, reviewed and confirmed, and thus facilitate accurate user review of the annotations and application of proper labels to the documents. Further, it is not clear from FIG. 1 what the system-determined confidence is of any label currently applied to any of the elements of 102, and what the confidences are of each of the other candidate labels 140, for any element of 102.

Is noted that the candidate labels 140 might be the entire collection of available labels for this document, or it might not be the entire collection. For example, the specific candidate labels presented by 140 might be those 'best available', e.g., those for which the system-determined confidence is greater than some threshold.

Figure 2A:
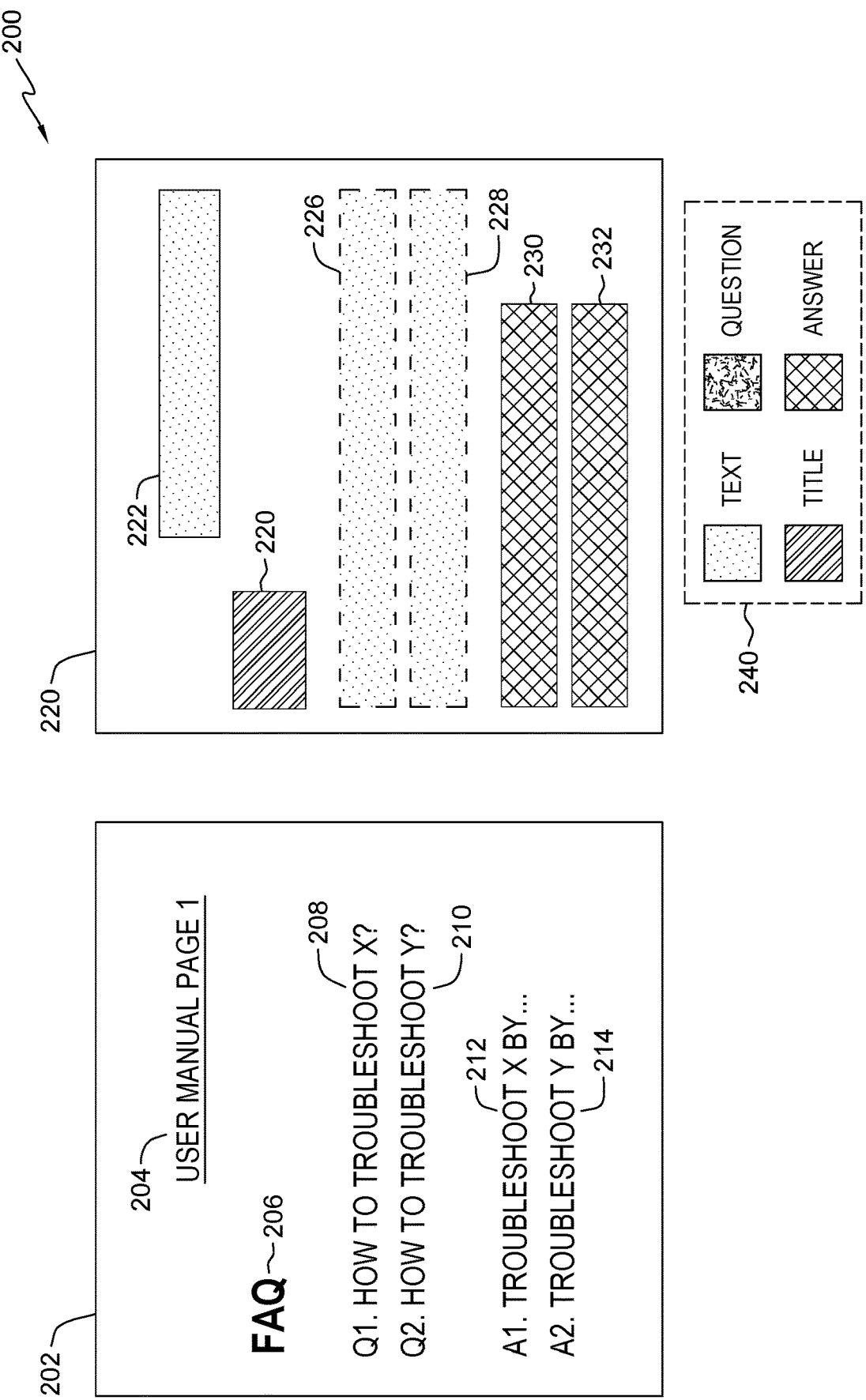
FIGS. 2A-2C depict example annotation user interfaces in accordance with aspects described herein.

FIG. 2A depicts an example annotation user interface in accordance with aspects described herein. Many elements of FIG. 2A are analogous to those of FIG. 1: the UI 200 presents the same document page (202) with same elements (204, 206, 208, 221, 212 and 214). Meanwhile interface portion 220 shows label indicators 222, 224, 226, 228, 230, 232, one for each of elements 204, 206, 208, 221, 212 and 214 of the document page 202, and are positioned as in FIG. 1. Here, however, the label indicators include borders/outlines of differing types to convey different meanings.

Each document element can have a label submission status—a status as to whether a label that is currently applied to the document element (a 'current label' for that document element) and reflected by the label indicator displayed is unsubmitted or, instead, is submitted and thereby confirmed by a user to be proper. Example label submission status can therefore be or include unsubmitted and submitted. Initially, for instance based on the auto-annotating using the AI model, a label that was automatically selected for a document element is unsubmitted. However, based on user submission of a label for the document element, a process that builds/presents the annotation UI can change a visually indicated label submission status for the document element to indicate a submitted label for the document element. In the example of FIG. 2, the label submission status for each document element is visually indicated by a border of the label indicator correlating to that document element. Labels indicators corresponding to submitted labels are surrounded with a solid-line border. In this example, the labels applied to elements 204, 206, 212 and 214, i.e. indicated by label indicators 222, 224, 230 and 232, have been submitted by the user to be the labels 'text', 'title', 'answer', and 'answer', respectively. In an example, the user has selected (clicked, right-clicked, etc.) on an interface element (button, selector, etc.) corresponding to each label indicator to accept/confirm the pre-annotated label that the system applied to the correlated document element, or to change the label for that document element to be a different candidate label.

Similarly, labels indicators corresponding to annotations/labels that have not been submitted are surrounded in a dashed-line border. In this manner, the label indicator used is that of the label candidate with the highest system-determined confidence, and the border of that label indicator is dashed. Label indicators 226 and 228 are shown dashed in this example because the labels 'text' have not yet been submitted/confirmed by the user to be accurate and proper for elements 208 and 210, respectively.

Figure 2B:
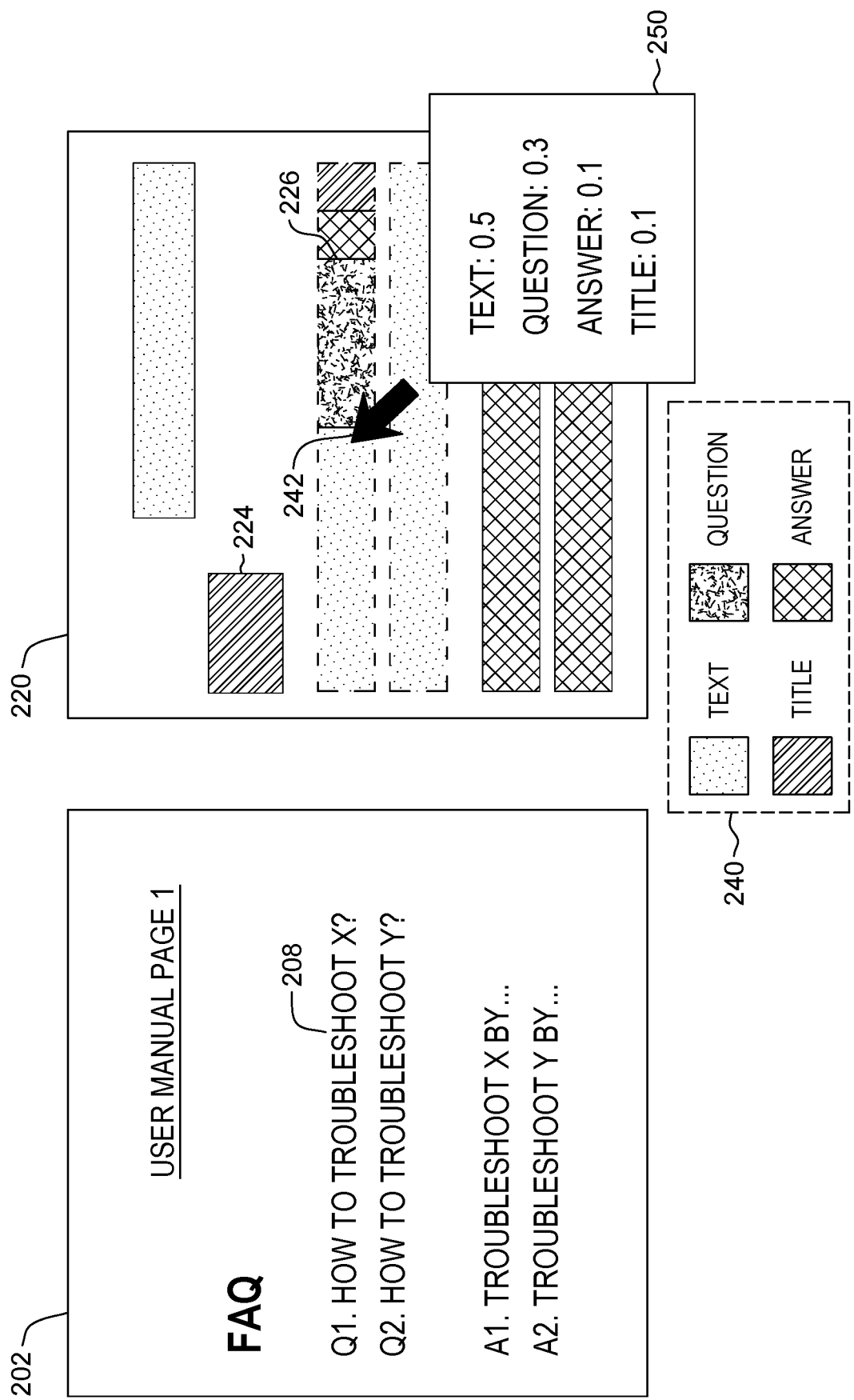

FIG. 2B depicts another example annotation user interface in accordance with aspects described herein. The example of FIG. 2B presents the example of FIG. 2A except that the user has hovered a pointer 242, a digital mouse cursor in this example, over the label indicator 226 that indicates an unsubmitted label of 'text' for document element 208. Other example pointers could be a fingertip, a smart pencil, or any other form of pointer device.

The label indicator 226 initially reflects (see FIG. 2A) the 'text' label as being the system generated pre-annotation for element 208, and thus in FIG. 2A the label indicator uses the highlight pattern for 'text' label but that label is unsubmitted as reflected by the dashed border of label indicator 226 in FIG. 2A.

In FIG. 2B, the user has hovered the pointer 242 over the label indicator 226 and the interface updates/changes the label indicator 226 to depict a component bar showing the component probabilities/confidence level values of each of the candidate labels for element 208. The system-generated confidences level values of labels 'text', 'title', 'question' and 'answer' for element 208 were 0.5 (50%), 0.3 (30%), 0.1 (10%) and 0.1 (10%), respectively. The label indicator 226 in this component-bar form shows, for each candidate label, a respective portion of the indicator 226 filled with the highlight pattern of that label proportional to that label's probability that it is the correct label for the document element. Thus, 50% of the label indicator 226 is the pattern for the 'text' label, 30% for the label 'title', and 10% for each of 'question' and 'answer' labels.

Accordingly, the component bar includes segments of different lengths and different visual properties. Each such segment corresponds to a different candidate label of a collection of available candidate labels, and the length of each segment is proportional to a confidence level value, determined by the AI model, that the candidate label to which the segment corresponds is a proper label for the document element to which the label indicator correlates.

In addition, the hover causes the system to depict a popup/overlay window 250 that presents the label names (text, question, answer, title) along with their respective confidences/probabilities, as determined by the model, that each such label is the proper label for element 208. The label names can be presented in a highlight pattern, color, etc. corresponding to how they are presented in legend 240, if desired.

If a user hovers over the label indicator for a document element with a submitted label (say 224), the system could present a component bar and/or overlay window as explained above, if desired.

Figure 2C:
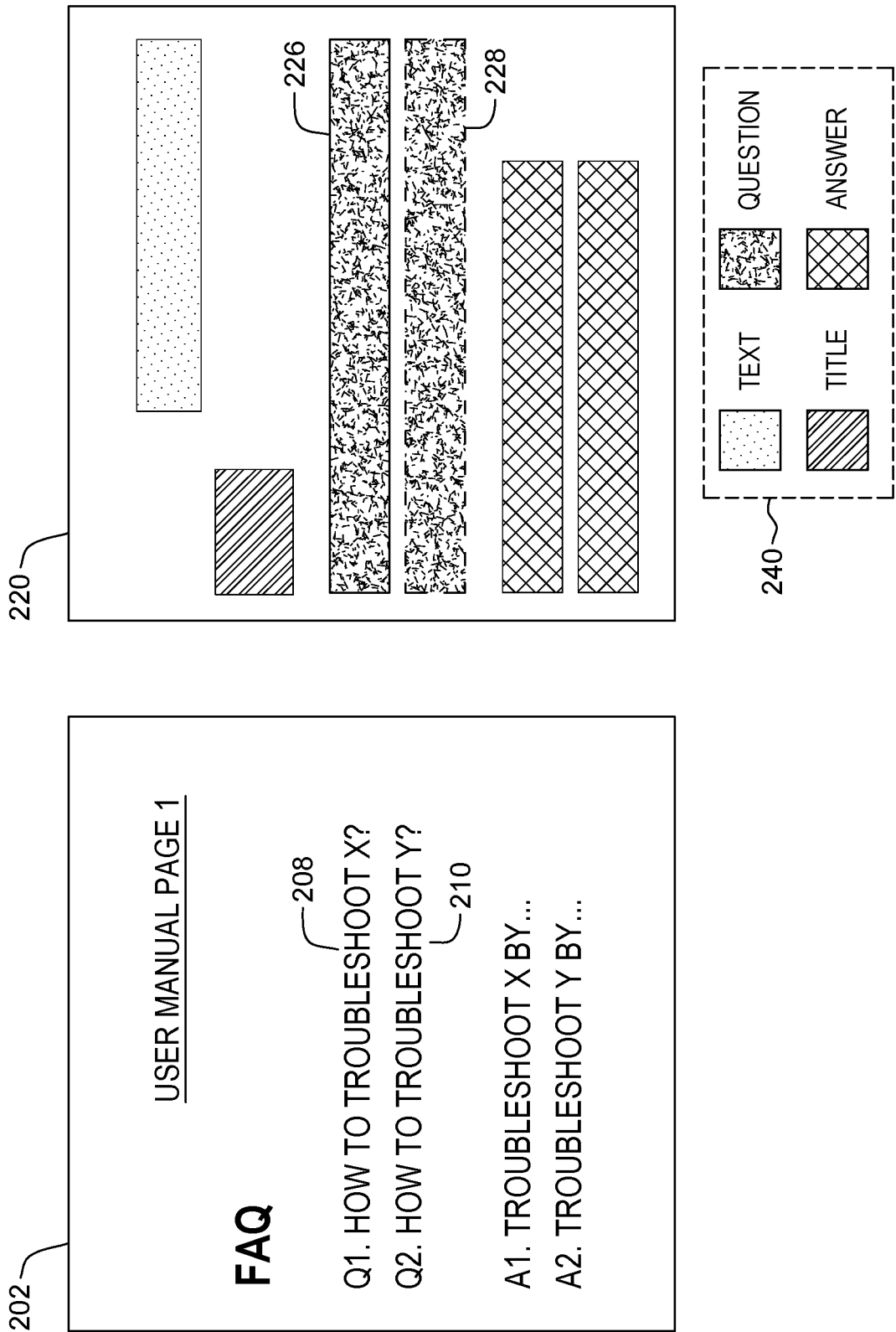

FIG. 2C depicts another example annotation user interface in accordance with aspects described herein. The example of FIG. 2C presents the example of FIG. 2A or 2B except that the user has submitted the label 'question' for element 208. For instance, the user clicks on the label indicator 226 and is presented a popup list of the candidate labels from 240, then selects/clicks on the 'question' label to submit the label 'question' for document element 208. Accordingly, the label indicator 226 has changed (relative to FIG. 2A, 2B) to the pattern for 'question' and has been given a solid border. The label for element 210 is the only label in this example that remains unsubmitted, as indicated by the dashed line border of label indicator 228.

On the basis of the user having submitted the label for element 208, a label weight adjustment can be automatically applied to unsubmitted labels of the document to update the confidence/probability of unsubmitted labels. This label weight adjustment may or may not produce a drastic enough adjustment to the confidence values that is necessarily changes which auto-annotation the system suggests to the user for any given element. Here, the user has changed the pre-annotation for element 208 from the 'text' label to the 'question' label (compare label indicator 226 of FIG. 2B indicating 'text' to label indicator 226 of FIG. 2C indicating 'question'). On the basis of this change, the system can update weight(s) of label candidates of unsubmitted auto-annotations. FIG. 2C reflects a label weight adjustment that was applied for element 210. The label pre-annotating element 210 was 'text', as was the label pre-annotating element 208. But the user has changed that label of element 208 from 'text' to 'question'. The system, recognizing this and responds by (i) decreasing a weight of the label 'text' for element 210 and (ii) increasing a weight of the label 'question' for element 210, all on the basis that element 210, like element 208, was originally pre-annotated to be the 'text' label but the user has changed label for element 208 and might therefore be expected to do so for element 210 given its similarity and proximity to element 208. A weight adjustment could be implemented as simply a reduction or increase in the confidence/probability of a label by a given value (1%, 5%), though other, more complex, weight adjustments could be used if desired.

In any case, there may or may not be a change in the top candidate label after a weight adjustment is applied. For instance, in FIG. 2C the weight adjustment has caused 'question' to be the label with the highest probability/confidence, a change from the label 'text' that was previously the highest probability. Consequently, the pre-annotation for element 210 has been updated to 'question', as indicated by the updated label indicator 228 in FIG. 2C (compare for FIG. 2A, 2B). However, the label of element 210 remains unsubmitted, as shown by the dashed border of label indicator 228. The user can proceed to confirm or change the label applied to element 210 by, for instance, clicking on the label indicator 228 and selecting to change or accept the updated 'question' label for element 210.

Figure 3:
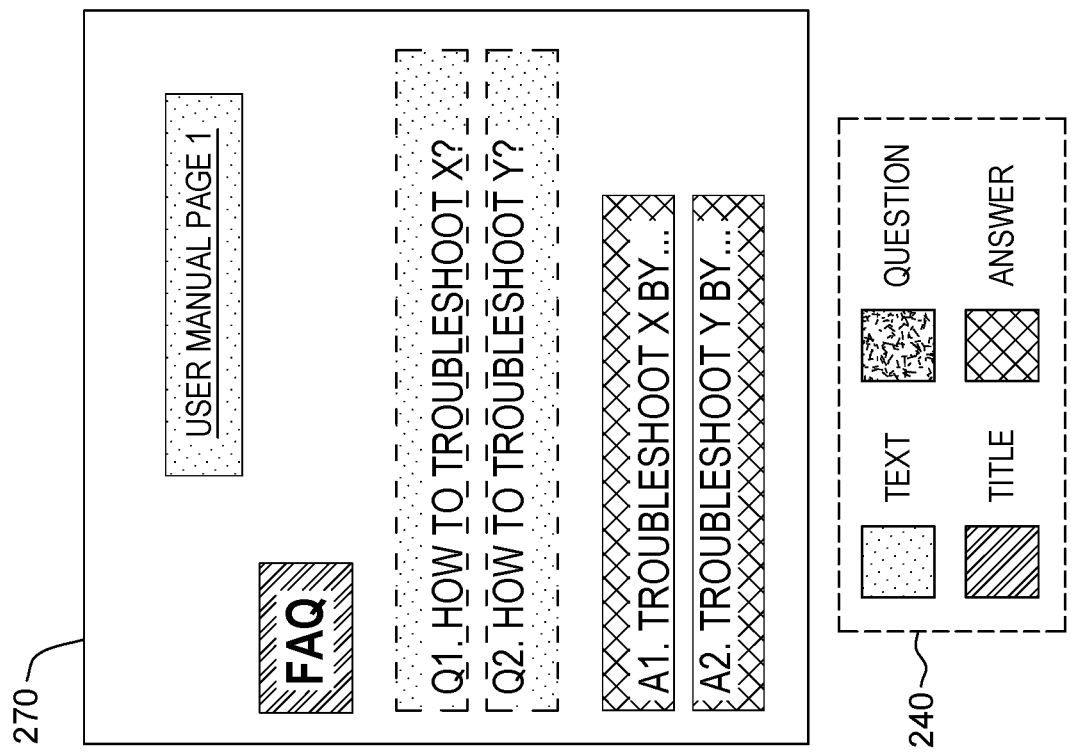
FIG. 3 depicts another example user annotation interface in accordance with aspects described herein.

FIG. 3 depicts another example user annotation interface in accordance with aspects described herein. The example of FIG. 3 conveys the same information as that of FIG. 2A in terms of submitted/unsubmitted labels of the document elements except that the interface presents the document elements overlaid by the corresponding label indicators. The document page 270 is the same as page 202 (FIG. 2A-2C) and has the same document elements. Unlike the examples of FIG. 2A-2C that include the separate label indicator portion 220, FIG. 3 depicts each label indicator overlaying in the annotation UI the respective document element to which the label indicator corresponds (and using the different borders/outlines as discussed above).

Accordingly, aspects include annotating document elements with visual indicators—highlights (colors, patterns, etc.)—of their labeling. This does not mean that the document elements themselves are being visually altered (see FIGS. 2A-3C for instance), though in some examples (FIG. 3 for instance) this could be the case. In accordance with some aspects, a solid highlight (color, pattern, etc.) for the label indicator indicates an auto-annotated element (pre-annotation), and a solid border for that label indicator indicates that the corresponding label is confirmed. For unsubmitted labels, the label indicator depicts (if the label indicator is not hovered-over by the mouse or otherwise selected) a single highlight that correlates to the top candidate label in terms of confidence. It also depicts a dashed border of the label indicator. If the label indicator is hovered-over by the mouse or otherwise selected, then the interface can present the confidences associated with two or more of the candidate labels, retain the dashed border of the label indicator to indicate that the label is not confirmed, and show a component bar that shows the component probabilities/confidences of each of two or more candidate labels where each such candidate label occupies a portion of the label indicator that is proportional to its confidence/probability across each of the candidate labels.

A specific embodiment of label weight adjustment includes determining which unsubmitted auto-annotation(s) are eligible for label weight adjustment. Given submission of a label, l, for a document element having label candidates l1, l2, l3 . . . ln, then for any unsubmitted auto-annotation with label candidates l'1, l'2, l'3 . . . l'm, calculate a Euclidean distance, d, between the submitted and unsubmitted labels. The two labels could be the same, in which case the distance is zero, however the two could be different candidate labels and the Euclidean distance would reflect similarity between them. If d is less than a configurable threshold, t, then adjust label weight(s) of one or more label candidates for the unsubmitted auto-annotation using a formula such as that set forth below. A Euclidean distance refers to similarity between the two labels. If a system auto-annotates two elements as 'text' (the Euclidean distance being zero in this case) and a user confirms the label 'text' on one of them, then the effect might be to increase the weight of the label 'text' for the other element. This would consequently decrease the weight of one or more other candidate labels for that other element. Conversely, if the user changed/confirmed the label of one to be 'question' instead of 'text', then the weight of the label 'text' for the other element may be decreased to yield an increase of the weight of label 'question' for that other element.

A change in weight may or may not result in a change of in the auto-annotated label for a document element, as this would depend on the thresholds/criteria for selecting a label with which to auto-annotate the element.

Additionally or alternatively, similarity between two elements may be used as a basis for adjusting label weight(s) of one element when the label for the other element is submitted. If two text elements both begin with the character string "Q:" followed by text that ends in a question mark character '?', then these two text elements are relatively similar in that they have matching substrings in similar character positions. If the label of one is confirmed to be 'question', then this might result in an increase in the weight of the label 'question' for the other element on the basis of the similarity between the two elements.

One embodiment of label weight adjustment is as follows: Given a submitted auto-annotation with l as selected label, then if an unsubmitted auto-annotation has label candidate l and the weight of confidence of label l is currently $wl_{current}$, adjust $wl_{current}$ to produce a new weight of confidence ($wl_{new}$) as: $wl_{new}=wl_{current}*(1+c)$, where c is a configurable constant, such as 5%. In this manner, when a user confirms that a system-determined auto-annotation (label l) was correct for a given element, this reinforces the confidence that the system correctly determined labels for other elements auto-annotated with label l, and the confidence that l is correct in those situations can be raised (e.g., by 5%) by way of the weight adjustment.

Figure 4:
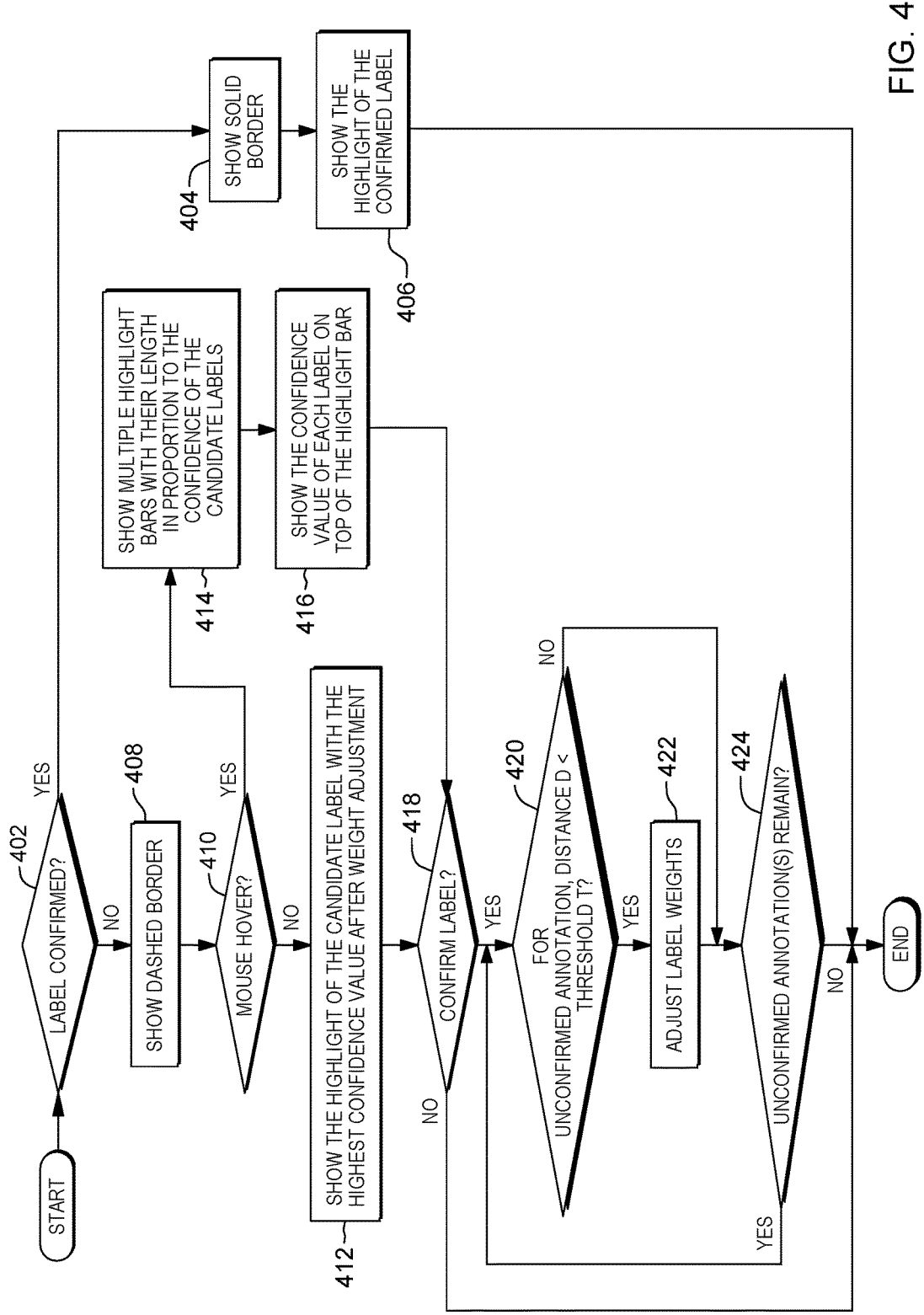
FIG. 4 depicts an example process for document element label annotation, in accordance with aspects described herein.

FIG. 4 depicts an example process for document element label annotation, in accordance with aspects described herein. In some examples, the process is performed for each document element pre-annotated with a label. The process is performed by a computer system, such as a computer system with which a user interacts to view the document and label annotations applied to elements of the document.

The process begins by determining (402), with respect to the subject document element, whether the user has submitted/confirmed a label for the document element. If so (402, Y), the process causes the UI to show (404) a solid border around the label indicator and show (406) the appropriate highlight/indicator corresponding to that label (for instance a pattern, color, and/or another visual indicator). It is noted that the interface could present the label indicator overlaying the document element (e.g., as in FIG. 3) or in a different portion of the interface than where the document element is displayed (e.g., as in FIGS. 2A-2C). The process ends at that point as the label has been submitted. Should the user undo the label submission or otherwise return the annotation status for the document element to be unsubmitted, then the process of FIG. 4 could be performed again for the element.

If instead the process determines at 402 that the user has not submitted a label for the document element (402, N), the process causes the UI to show (408) a dashed border around the label indicator. The presentation of the label indicator itself can vary depending on whether the user hovers over the label indicator. Thus, the process determines (410) whether the user has hovered the mouse cursor over the label indicator in the interface. If not (410, N), the process shows (412) the highlight/indicator of the candidate label with the highest confidence after any applicable weight adjustments. Otherwise (410, Y), the process shows (414) a component bar with multiple highlights/indicators, their length being in proportion to the relative confidences of their corresponding candidate labels, and shows (416) those confidence values of each such label in an overlay box (e.g., as shown by FIG. 2B).

The label indicator is presented as above while the label remains unconfirmed/unsubmitted. During this time, the process can determine (418) whether the label has been confirmed. If not (418, N), the process ends and repeats (periodically or aperiodically) with respect to this element, or alternatively sleeps or loops on the determination 418 and periodically or aperiodically repeats the determination. Whenever the document element remains visible in the user interface of the computer system, the process of FIG. 4 could be repeated to properly display the label indicator for the element.

At some point when the label is confirmed (418, Y), the process proceeds by determining (420) whether there is an unconfirmed label, and if so whether it corresponds to the confirmed label, e.g., with a distance, d, from the confirmed label, less than a set threshold t. If there is an unconfirmed label and it corresponds to the confirmed label (420, Y), the process adjusts (422) the label weight of the corresponding label. Then, or if d is not less than t (the unconfirmed annotation had a distance from the confirmed label greater than or equal to t), the process determines (424) whether there remain any other unconfirmed labels for potential weight adjustment. If so (424, Y), the process returns to 420. Otherwise (424, N), the process ends.

Figure 5:
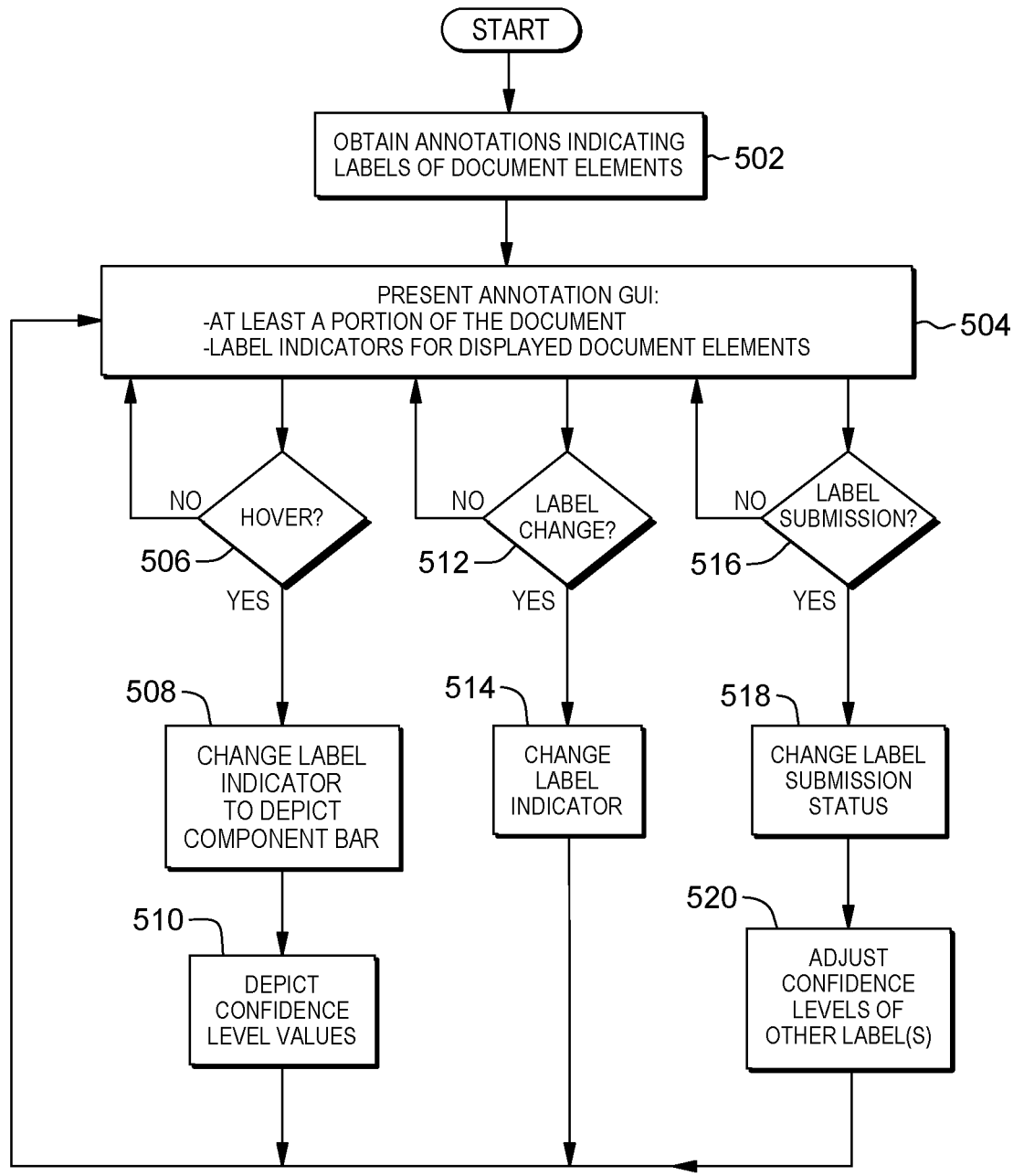
FIG. 5 depicts an example process for facilitating annotation of document elements, in accordance with aspects described herein.

FIG. 5 depicts an example process for facilitating annotation of document elements, in accordance with aspects described herein. In some examples, the process is performed by one or more computer systems, such as those described herein, which may include one or more computer systems presenting an annotation user interface with which a user interacts.

The process obtains (502) annotations indicating labels applied to document elements of a digital document to be presented in an annotation graphical user interface (GUI). The digital document includes the document elements, and the document elements are for visual presentation in the annotation GUI to a user. In examples, the obtained annotations are unsubmitted labels that were automatically previously selected and applied to the document elements by an artificial intelligence model that is trained to label document elements with labels. The selected and applied labels are unsubmitted and subject to review, change, and submission by the user to confirm proper labeling of the document elements. The annotation GUI is configured to facilitate user submission of a respective label for each document element of the document elements.

The process continues by presenting (504) the annotation GUI on a display device (which could encompass one or more display devices, such as computer monitor(s)) for the user. This presenting presents, as part of the annotation GUI, at least a portion of the digital document including the document elements (such as a page of the document that includes the document elements), for each document element of the document elements, a respective label indicator correlating to the document element. The respective label indicator for a document element visually indicates, for instance via color, highlight, pattern, another visually-presentable property, a current label selected for that document element and a label submission status for that document element. The label submission status is reflective of whether the user has confirmed a label for that document element.

The annotation GUI includes, in one embodiment, a label indicator portion in which the label indicators correlating to the document elements are presented and a document display portion, separate from the label indicator portion, in which the at least a portion of the digital document including the document elements is presented (e.g., as in FIGS. 2A-2C). In another embodiment, each respective label indicator overlays in the annotation GUI the document element to which the respective label indicator correlates (e.g. as in FIG. 3).

The system can provide a collection of candidate labels available to the user via the annotation GUI for labeling the document elements. Each such candidate label of the collection can be associated with a different visual property that uniquely identifies that candidate label out of the collection of candidate labels and that the process is configured to apply to label indicators correlating to document elements labeled with that candidate label. The unique visual property includes a highlight, a pattern, and/or a color applied to the label indicator.

The user can interact with the annotation GUI to, as examples, change labels, submit labels, and hover over a label indicator to obtain additional information about label confidences. As part of presenting the annotation GUI, the process determines (506) whether the user hovers a pointer over a label indicator. If not (506, N), the process loops back to 504 to continue presenting the annotation GUI. Otherwise, based on the user hovering a pointer over a label indicator (506, Y), which correlates to a document element of the document elements, the process changes (508) the label indicator to depict a component bar with segments of different lengths and different visual properties. Each segment of the segments corresponds to a different candidate label of the collection of candidate labels, and the length of each segment is proportional to a confidence level value, determined by an artificial intelligence model, that the candidate label to which the segment corresponds is a proper label for the document element. The process also depicts (510), for each segment of the segments, the confidence level value that the candidate label to which that segment corresponds is the proper label for the document element and loops back to 504 to continue presenting the annotation GUI.

Further as part of presenting the annotation GUI, the process determines (512) whether the user changes the current label for a document element. If not (506, N), the process loops back to 504 to continue presenting the annotation GUI. Otherwise, based on the user changing the current label for a document element from a first candidate label of the collection of candidate labels to a second candidate label of the collection of labels (512, Y), the process changes (514) the label indicator correlating to the document element to visually indicate the second candidate label. Before the change, the label indicator reflects the visual property that uniquely identifies the first candidate label and the change changes the label indicator to reflect the visual property that uniquely identifies the second candidate label.

Further as part of presenting the annotation GUI, the process determines (516), for a current label, selected for a document element, that is initially unsubmitted, whether the user submits a label for the document element. If not (516, N), the process loops back to 504 to continue presenting the annotation GUI. Otherwise, based on the user submitting a label for the document element (516, Y), the process changes (518) the visually indicated label submission status for the document element to indicate a submitted label for the document element. In some embodiments, the label submission status for the document element is visually indicated by a border of the label indicator, a dashed border of the label indicator indicates an unsubmitted label for the document element, and a solid border of the label indicator indicates a submitted label for the document element. Thus, before a submission of a label for the document element the border of the label indicator is presented as a dashed border to indicate an unsubmitted label and based on the submission of the label for the document element the border of the label indicator is presented as a solid border to indicate a submitted label.

Optionally the process then adjusts (520) confidence levels of other label(s). For instance, based on the user submitting a label, l, for a document element of the document elements, the process adjusts a confidence level value that an unsubmitted label, l', is a proper label for another document element, where a relation between l and l' is that (i) l and l' are the same candidate label or that (ii) l and l' are different candidate labels and a Euclidean distance reflecting similarity between l and l' is below a preconfigured threshold.

Although various examples are provided, variations are possible without departing from a spirit of the claimed aspects.

Figure 6:
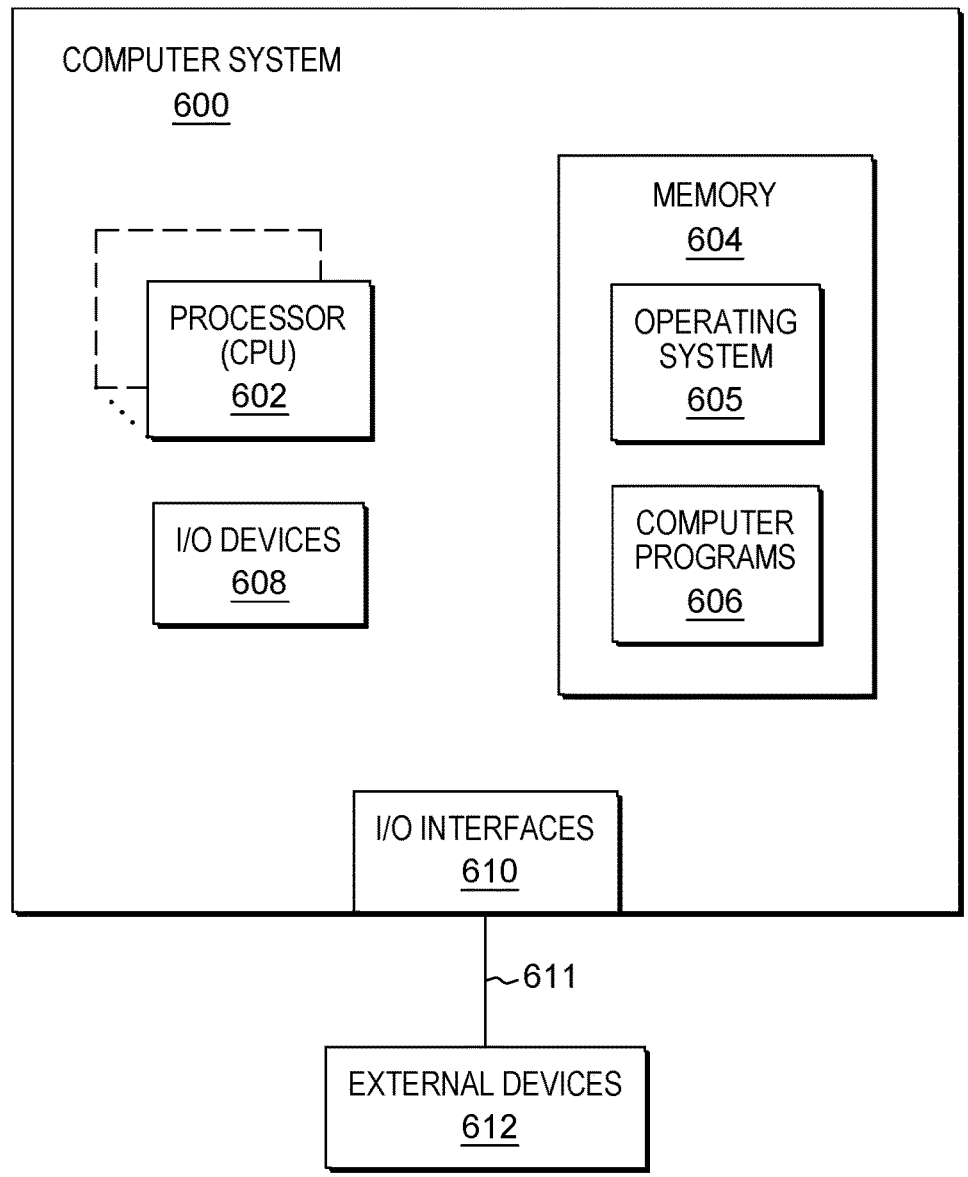
FIG. 6 depicts one example of a computer system and associated devices to incorporate and/or use aspects described herein.

Processes described herein may be performed singly or collectively by one or more computer systems. FIG. 6 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 6 shows a computer system 600 in communication with external device(s) 612. Computer system 600 includes one or more processor(s) 602, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 602 can also include register(s) to be used by one or more of the functional components. Computer system 600 also includes memory 604, input/output (I/O) devices 608, and I/O interfaces 610, which may be coupled to processor(s) 602 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 604 can be or include main or system memory (e.g. Random Access Memory) used in the execution of program instructions, storage device(s) such as hard drive(s), flash media, or optical media as examples, and/or cache memory, as examples. Memory 604 can include, for instance, a cache, such as a shared cache, which may be coupled to local caches (examples include L1 cache, L2 cache, etc.) of processor(s) 602. Additionally, memory 604 may be or include at least one computer program product having a set (e.g., at least one) of program modules, instructions, code or the like that is/are configured to carry out functions of embodiments described herein when executed by one or more processors.

Memory 604 can store an operating system 605 and other computer programs 606, such as one or more computer programs/applications that execute to perform aspects described herein. Specifically, programs/applications can include computer readable program instructions that may be configured to carry out functions of embodiments of aspects described herein.

Examples of I/O devices 608 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (612) coupled to the computer system through one or more I/O interfaces 610.

Computer system 600 may communicate with one or more external devices 612 via one or more I/O interfaces 610. Example external devices include a keyboard, a pointing device, a display, and/or any other devices that enable a user to interact with computer system 600. Other example external devices include any device that enables computer system 600 to communicate with one or more other computing systems or peripheral devices such as a printer. A network interface/adapter is an example I/O interface that enables computer system 600 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 610 and external devices 612 can occur across wired and/or wireless communications link(s) 611, such as Ethernet-based wired or wireless connections. Example wireless connections include cellular, Wi-Fi, Bluetooth®, proximity-based, near-field, or other types of wireless connections. More generally, communications link(s) 611 may be any appropriate wireless and/or wired communication link(s) for communicating data.

Particular external device(s) 612 may include one or more data storage devices, which may store one or more programs, one or more computer readable program instructions, and/or data, etc. Computer system 600 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 600 may be operational with numerous other general purpose or special purpose computing system environments or configurations. Computer system 600 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
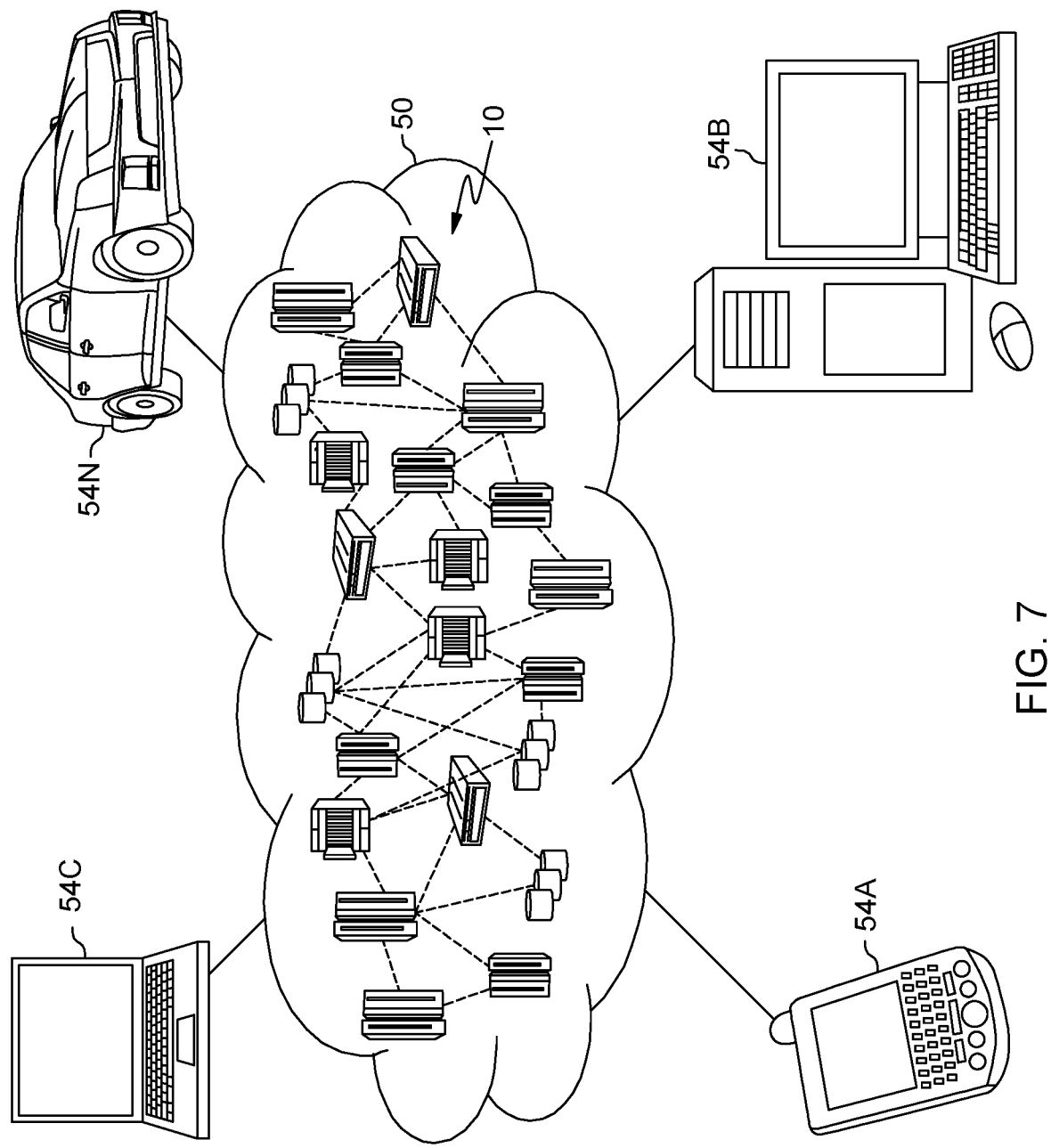
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
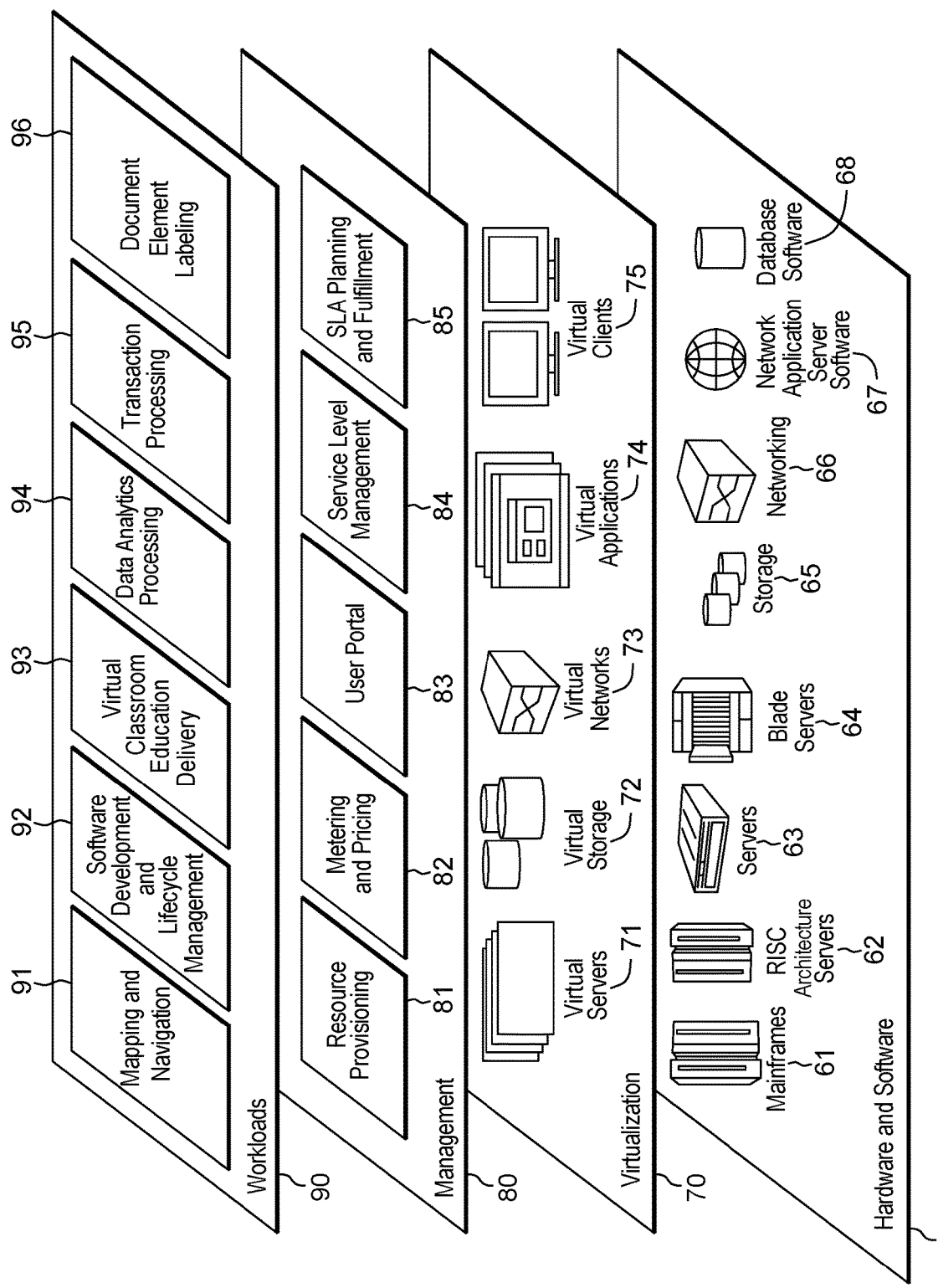
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and document element labeling 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    obtaining annotations indicating labels applied to document elements of a digital document to be presented in an annotation graphical user interface (GUI), the digital document comprising the document elements, and the document elements being for visual presentation in the annotation GUI to a user; and
    presenting the annotation GUI on a display device for the user, the annotation GUI configured to facilitate user submission of a respective label for each document element of the document elements, wherein the presenting presents, as part of the annotation GUI:
        at least a portion of the digital document including the document elements; and
        for each document element of the document elements, a respective label indicator correlating to the document element, the respective label indicator visually indicating a current label selected for that document element and a label submission status for that document element, the label submission status reflective of whether the user has confirmed a label for that document element, wherein presenting the respective label indicator correlating to the document element comprises presenting the respective label indicator at a position in the annotation GUI that is based on a position at which the document element is presented in the annotation GUI.

2. The method of claim 1, wherein the obtained annotations indicating labels applied to the document elements of the digital document are unsubmitted labels automatically previously selected and applied to the document elements by an artificial intelligence model trained to label the document elements with labels subject to review and submission by the user to confirm proper labeling of the document elements.

3. The method of claim 1, wherein a collection of candidate labels are available to the user via the annotation GUI for labeling the document elements, each candidate label of the collection of candidate labels being associated with a different visual property that uniquely identifies that candidate label out of the collection of candidate labels and that the method is configured to apply to label indicators correlating to document elements labeled with that candidate label.

4. The method of claim 3, wherein the unique visual property comprises at least one selected from the group consisting of: a highlight, a pattern, and a color.

5. The method of claim 3, wherein presenting the annotation GUI comprises, based on the user hovering a pointer over a label indicator correlating to a document element of the document elements, changing the label indicator to depict a component bar with segments of different lengths and different visual properties, each segment of the segments corresponding to a different candidate label of the collection of candidate labels, and the length of each segment being proportional to a confidence level value, determined by an artificial intelligence model, that the candidate label to which the segment corresponds is a proper label for the document element, and wherein presenting the GUI further comprises, based on the user hovering the pointer over the label indicator, depicting, for each segment of the segments, the confidence level value that the candidate label to which that segment corresponds is the proper label for the document element.

6. The method of claim 3, wherein presenting the annotation GUI comprises, based on the user changing the current label for a document element of the document elements from a first candidate label of the collection of candidate labels to a second candidate label of the collection of labels, changing the label indicator correlating to the document element to visually indicate the second candidate label, wherein before the changing the label indicator reflects the visual property that uniquely identifies the first candidate label, and wherein the changing changes the label indicator to reflect the visual property that uniquely identifies the second candidate label.

7. The method of claim 1, wherein the current label selected for a document element of the document is initially unsubmitted, and wherein presenting the annotation GUI comprises, based on user submission of a label for the document element, changing the visually indicated label submission status for the document element to indicate a submitted label for the document element.

8. The method of claim 7, wherein the label submission status for the document element is visually indicated by a border of the label indicator, wherein a dashed border of the label indicator indicates an unsubmitted label for the document element and a solid border of the label indicator indicates a submitted label for the document element, wherein before the submission of the label for the document element the border of the label indicator is presented as a dashed border to indicate an unsubmitted label, and wherein based on the submission of the label for the document element the border of the label indicator is presented as a solid border to indicate a submitted label.

9. The method of claim 1, further comprising, based on the user submitting a label, l, for a document element of the document elements, adjusting a confidence level value that an unsubmitted label, l', is a proper label for another document element, wherein a relation between l and l' is one selected from the group consisting of: (i) l and l' are the same candidate label, and (ii) l and l' are different candidate labels and a Euclidean distance reflecting similarity between l and l' is below a preconfigured threshold.

10. The method of claim 1, wherein the annotation GUI comprises (i) a label indicator portion in which the label indicators correlating to the document elements are presented and (ii) a document display portion, separate from the label indicator portion, in which the at least a portion of the digital document including the document elements is presented.

11. The method of claim 1, wherein each respective label indicator overlays in the annotation GUI the document element to which the respective label indicator correlates.

12. The method of claim 1, wherein positions of different label indicators relative to each other in the annotation GUI, the different label indicators correlating to different document elements of the plurality of document elements, correspond to positions of the different document elements relative to each other in the annotation GUI.

13. A computer system comprising:
a memory; and
a processor in communication with the memory, wherein the computer system is configured to perform a method comprising:
obtaining annotations indicating labels applied to document elements of a digital document to be presented in an annotation graphical user interface (GUI), the digital document comprising the document elements, and the document elements being for visual presentation in the annotation GUI to a user; and
presenting the annotation GUI on a display device for the user, the annotation GUI configured to facilitate user submission of a respective label for each document element of the document elements, wherein the presenting presents, as part of the annotation GUI:
at least a portion of the digital document including the document elements; and
for each document element of the document elements, a respective label indicator correlating to the document element, the respective label indicator visually indicating a current label selected for that document element and a label submission status for that document element, the label submission status reflective of whether the user has confirmed a label for that document element, wherein presenting the respective label indicator correlating to the document element comprises presenting the respective label indicator at a position in the annotation GUI that is based on a position at which the document element is presented in the annotation GUI.

14. The computer system of claim 13, wherein a collection of candidate labels are available to the user via the annotation GUI for labeling the document elements, each candidate label of the collection of candidate labels being associated with a different visual property that uniquely identifies that candidate label out of the collection of candidate labels and that the method is configured to apply to label indicators correlating to document elements labeled with that candidate label.

15. The computer system of claim 14, wherein presenting the annotation GUI comprises, based on the user hovering a pointer over a label indicator correlating to a document element of the document elements, changing the label indicator to depict a component bar with segments of different lengths and different visual properties, each segment of the segments corresponding to a different candidate label of the collection of candidate labels, and the length of each segment being proportional to a confidence level value, determined by an artificial intelligence model, that the candidate label to which the segment corresponds is a proper label for the document element.

16. The computer system of claim 14, wherein presenting the annotation GUI comprises, based on the user changing the current label for a document element of the document elements from a first candidate label of the collection of candidate labels to a second candidate label of the collection of labels, changing the label indicator correlating to the document element to visually indicate the second candidate label, wherein before the changing the label indicator reflects the visual property that uniquely identifies the first candidate label, and wherein the changing changes the label indicator to reflect the visual property that uniquely identifies the second candidate label.

17. The computer system of claim 13, wherein the current label selected for a document element of the document is initially unsubmitted, wherein presenting the annotation GUI comprises, based on user submission of a label for the document element, changing the visually indicated label submission status for the document element to indicate a submitted label for the document element, wherein the label submission status for the document element is visually indicated by a border of the label indicator, wherein a dashed border of the label indicator indicates an unsubmitted label for the document element and a solid border of the label indicator indicates a submitted label for the document element, wherein before the submission of the label for the document element the border of the label indicator is presented as a dashed border to indicate an unsubmitted label, and wherein based on the submission of the label for the document element the border of the label indicator is presented as a solid border to indicate a submitted label.

18. A computer program product comprising:
a computer readable storage medium readable by a processing circuit and storing instructions for execution by the processing circuit for performing a method comprising:
obtaining annotations indicating labels applied to document elements of a digital document to be presented in an annotation graphical user interface (GUI), the digital document comprising the document elements, and the document elements being for visual presentation in the annotation GUI to a user; and
presenting the annotation GUI on a display device for the user, the annotation GUI configured to facilitate user submission of a respective label for each document element of the document elements, wherein the presenting presents, as part of the annotation GUI:
at least a portion of the digital document including the document elements; and
for each document element of the document elements, a respective label indicator correlating to the document element, the respective label indicator visually indicating a current label selected for that document element and a label submission status for that document element, the label submission status reflective of whether the user has confirmed a label for that document element, wherein presenting the respective label indicator correlating to the document element comprises presenting the respective label indicator at a position in the annotation GUI that is based on a position at which the document element is presented in the annotation GUI.

19. The computer program product of claim 18, wherein a collection of candidate labels are available to the user via the annotation GUI for labeling the document elements, each candidate label of the collection of candidate labels being associated with a different visual property that uniquely identifies that candidate label out of the collection of candidate labels and that the method is configured to apply to label indicators correlating to document elements labeled with that candidate label, and wherein presenting the annotation GUI comprises:

based on the user hovering a pointer over a label indicator correlating to a document element of the document elements, changing the label indicator to depict a component bar with segments of different lengths and different visual properties, each segment of the segments corresponding to a different candidate label of the collection of candidate labels, and the length of each segment being proportional to a confidence level value, determined by an artificial intelligence model, that the candidate label to which the segment corresponds is a proper label for the document element; and based on the user changing the current label for a document element of the document elements from a first candidate label of the collection of candidate labels to a second candidate label of the collection of labels, changing the label indicator correlating to the document element to visually indicate the second candidate label, wherein before the changing the label indicator reflects the visual property that uniquely identifies the first candidate label, and wherein the changing changes the label indicator to reflect the visual property that uniquely identifies the second candidate label.

20. The computer program product of claim 18, wherein the current label selected for a document element of the document is initially unsubmitted, wherein presenting the annotation GUI comprises, based on user submission of a label for the document element, changing the visually indicated label submission status for the document element to indicate a submitted label for the document element, wherein the label submission status for the document element is visually indicated by a border of the label indicator, wherein a dashed border of the label indicator indicates an unsubmitted label for the document element and a solid border of the label indicator indicates a submitted label for the document element, wherein before the submission of the label for the document element the border of the label indicator is presented as a dashed border to indicate an unsubmitted label, and wherein based on the submission of the label for the document element the border of the label indicator is presented as a solid border to indicate a submitted label.

* * * * *